H. S. KIMBALL.
PROCESS OF MAKING PHENOLS.
APPLICATION FILED JULY 24, 1915.
1,245,353.
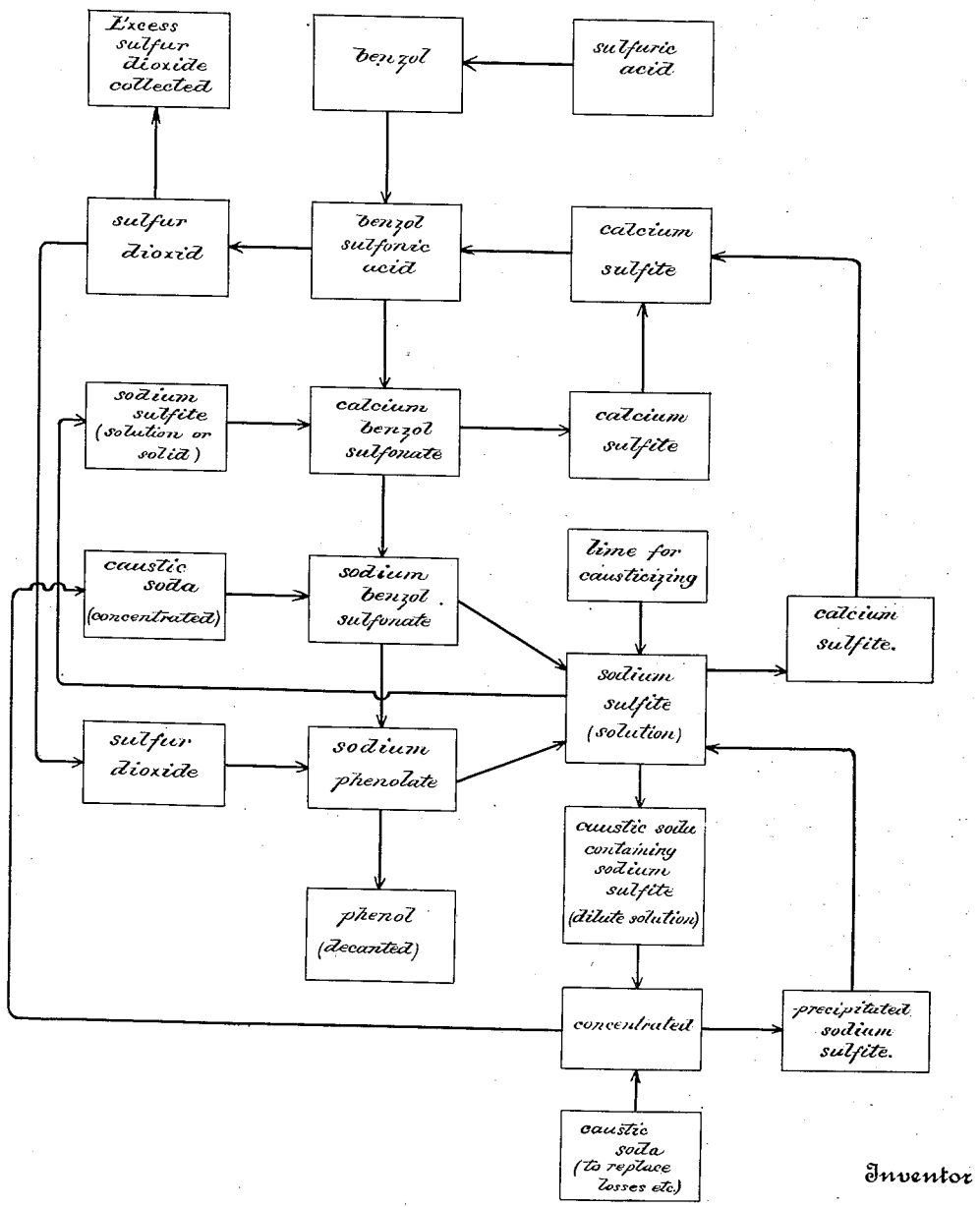

UNITED STATES PATENT OFFICE.

HERBERT S. KIMBALL, OF NEWTON, MASSACHUSETTS, ASSIGNOR TO MERRIMAC CHEMICAL COMPANY, OF BOSTON, MASSACHUSETTS, A CORPORATION OF MASSACHUSETTS.

PROCESS OF MAKING PHENOLS.

1,245,353.  Specification of Letters Patent.  Patented Nov. 6, 1917.

Application filed July 24, 1915. Serial No. 41,659.

*To all whom it may concern:*

Be it known that I, HERBERT S. KIMBALL, a citizen of the United States, residing at Newton, in the county of Middlesex and State of Massachusetts, have invented certain new and useful Improvements in Processes of Making Phenols, of which the following is a specification.

According to the present invention phenols are prepared from the corresponding aromatic hydrocarbons, as phenol from benzol, by a cyclical process which is an improvement upon that described in a copending application of Henry Howard, Serial No. 29,825, filed May 22, 1915.

The present invention may be carried out as follows: The benzol is first sulfonated as usual, and the resulting sulfonic acid compound, containing an excess of sulfuric acid, is wholly or partly neutralized by calcium sulfite, utilizing for this purpose the calcium sulfite which is produced at a later stage of the cyclical process, as explained below. The neutralization is effected in closed tanks, and the evolved sulfur dioxid, or such portion thereof as may be required, is employed to decompose the sodium phenolate as described in the above mentioned application. In case the quantity of calcium sulfite available is insufficient for complete neutralization of the sulfonic acid compound, it is supplemented by lime or limestone.

The calcium benzol sulfonate prepared as above is treated with the molecular equivalent of sodium sulfite, and is thereby transformed into sodium benzol sulfonate. The sodium sulfite may be introduced either in solution or in solid form into the solution of calcium benzol sulfonate, and the calcium sulfite which separates out is applied toward the neutralization of the sulfonic acid compound produced in the first step of the process.

The sodium benzol sulfonate is now subjected to a caustic fusion to produce sodium phenolate, which in turn is decomposed by sulfur dioxid (undiluted) arising from the neutralization step of the process. The phenol is decanted, and the remaining liquor, containing sodium sulfite or bisulfite or a mixture of these is utilized in part for the conversion of the calcium benzol sulfonate into the corresponding sodium salt as above described, and is in part causticized by lime, yielding a dilute caustic soda solution, and calcium sulfite, the latter available for neutralizing the benzol sulfonic acid. If desired the caustic soda solution may be concentrated and returned to the cycle.

A complete cycle embodying the invention is shown on the accompanying diagram. It is to be understood however that the present invention is not limited to the performance of the complete cycle as therein indicated, but relates more particularly to the utilization of sodium sulfite for converting calcium benzol sulfonate into sodium benzol sulfonate, as a step preceding the usual caustic fusion for the production of phenolate. This conversion is of course particularly advantageous in conjunction with the employment of sulfur dioxid to liberate the phenol from the phenolate, as disclosed in the said Howard application, inasmuch as the sodium sulfite required is thereby produced in the regular operation of the process.

While I have explained my process with specific reference to the preparation of phenol from benzol, it is to be understood that the invention is not restricted to this particular reaction, but is applicable in the production of phenols in general from the corresponding aromatic hydrocarbons.

I claim:—

1. In a process of making phenols from the corresponding aromatic hydrocarbons, the steps which consist in sulfonating the hydrocarbon, neutralizing the sulfonic acid compound by a calcium compound, and transforming the resulting calcium sulfonic compound into the corresponding sodium salt by means of sodium sulfite.

2. In a process of making phenols from the corresponding aromatic hydrocarbons, the steps which consist in sulfonating the hydrocarbon, neutralizing the sulfonic acid compound by calcium sulfite, and transforming the resulting calcium sulfonic compound into the corresponding sodium salt by means of sodium sulfite.

3. In a process of making phenols from the corresponding aromatic hydrocarbons, the steps which consist in sulfonating the hydrocarbon, neutralizing the sulfonic acid compound by calcium sulfite with evolution of sulfur dioxid, transforming the resulting calcium sulfonic compound into the corresponding sodium salt by means of sodium sulfite, and utilizing the sulfur dioxid evolved during the neutralization for the preparation of sodium sulfite.

4. A cyclical process of making phenols from the corresponding aromatic hydrocarbons, which consists in sulfonating the hydrocarbon, neutralizing the sulfonic acid compound by calcium sulfite with evolution of sulfur dioxid, transforming the resulting calcium sulfonic compound into the corresponding sodium salt by means of sodium sulfite, converting the sodium salt into phenolate by treating the same with caustic soda, and liberating phenol from the phenolate with simultaneous production of sodium sulfite by reacting thereon with the sulfur dioxid evolved during the neutralization.

5. In a process of the character described, the step which consists in reacting with sodium sulfite on calcium benzol sulfonate.

In testimony whereof I affix my signature in presence of two witnesses.

HERBERT S. KIMBALL.

Witnesses:
 LEON E. AMBROSE,
 HAROLD A. PIPER.